Patented Jan. 6, 1953

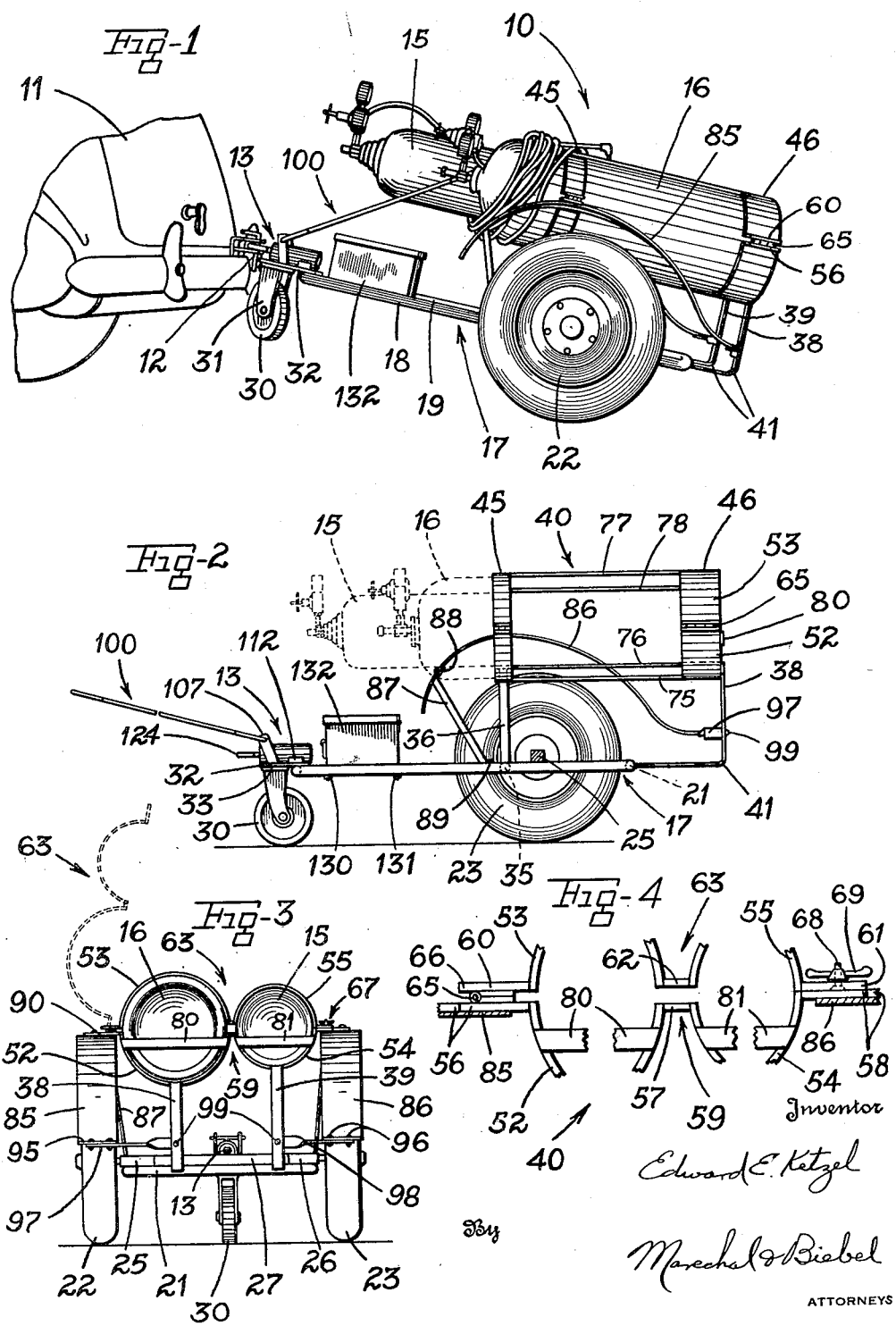

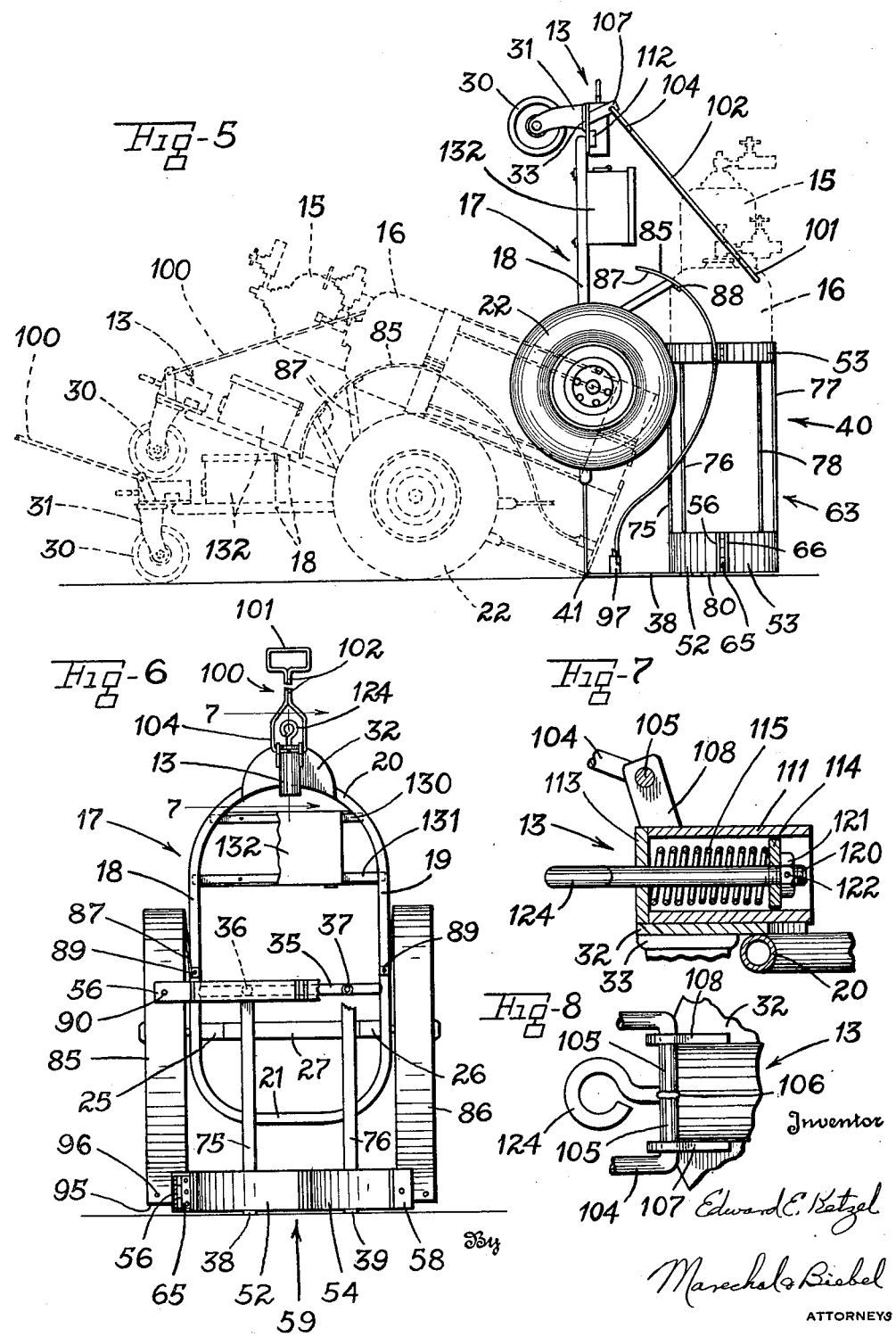

2,624,483

UNITED STATES PATENT OFFICE 2,624,483

CARRIER FOR WELDING OUTFITS

Edward E. Ketzel, Dayton, Ohio

Application February 16, 1950, Serial No. 144,545

6 Claims. (Cl. 214—380)

This invention relates to carriers and holders for welding outfits including the gas cylinders used in welding, such as oxygen and acetylene cylinders, and more particularly to a combined carrier and holder adapted both to transport such outfit on the highway behind a vehicle and to hold it firmly in an upright position during welding operations.

The cylinders containing gas under pressure used in welding operations are heavy metal cylinders of substantial weight. Cylinders of oxygen and of acetylene are used together, their combined weight being too great to be readily lifted by one operator, and once the outfit is connected and placed in position it can be moved only with difficulty, sometimes requiring that it be at least partially disassembled, and necessitating the services of two or more men working together.

In practical operations, welding jobs often must be performed in the field, because the material to be welded, such as large tanks or bridge repair work, cannot be moved to a factory, shop or other location where welding equipment is permanently available, or it is more convenient and economical to move the equipment to the site of the job than to move the job into the shop.

Where welding operators having work of the character indicated outside their shop use an automotive truck to transport the cylinders and their accompanying equipment to such outside jobs, a relatively expensive truck is tied up, or the truck must be repeatedly loaded and unloaded. The services of more than one man are ordinarily required in this loading and unloading and in otherwise moving the outfit, by reason of the weight and generally awkward shape of the cylinders and the necessity of protecting the valves, gauges and welding equipment attached to them. Furthermore, there is always the possibility in moving the outfit that one of the heavy cylinders may be dropped and injure the persons handling it, or damaging the relatively fragile equipment attached thereto.

After the equipment has been transported to a job site, it may be necessary to move the outfit into a building or to some other space not accessible to an automotive truck. Even inside a factory, shop, or other place in which welding equipment is used, it may often be necessary or convenient to move the equipment from one place to another.

When the outfit is being used in welding operations, either inside a shop or factory or on an outside job, it is desirable to stand it in an upright position on the base of the cylinders, i. e., the end opposite the one containing the valves and to which the hoses and auxiliary equipment are attached. This base is ordinarily of relatively small diameter and, although the weight of the cylinders gives them some stability in this position, there is always danger that they may accidentally fall or be pushed over, with the possibility of injuring someone or of damaging the various connections.

The present invention affords an unusually flexible, efficient and inexpensive apparatus for moving and holding a welding outfit and its gas cylinders which overcomes these difficulties and inefficiencies in handling the outfit, and which in addition offers many advantages in efficient operation. It embodies a carrier on which the outfit may be loaded and held, and on which it may be transported from job site to job site on the highway as a vehicle trailer behind an ordinary passenger automobile or truck. The attaching means include a shock-absorbing hitch which improves the riding qualities of the carrier and reduces jarring of the cylinders during transportation. The carrier is sufficiently strong and well balanced so that it may be pulled at all ordinary speeds of travel without undue jerking or dragging and without adversely affecting the steering and riding qualities of the vehicle pulling it. At the same time it is so designed that the cylinders are resiliently supported, and even at relatively fast speeds are not subjected to undue jolting.

The carrier is nevertheless sufficiently small and light that, disengaged from a vehicle, it can be employed as a hand truck pulled by a handle, both on the comparatively smooth floors of a shop or factory, and on relatively rough terrain out of doors. Under either set of conditions, the entire weight of the carrier itself and of the welding outfit and cylinders is carried on the wheels of the carrier.

The present device is so constructed that when the cylinders are placed in position on it, and the carrier and cylinders are placed in an upright position, the rear portion of the carrier serves as a broad, firm base, stabilizing the cylinders and holding them from tipping or being accidentally made to fall over. It is in addition so arranged that the weight of the carriage and of the cylinders tend to counterbalance each other, so as substantially to reduce the effort necessary to move the cylinders from either the horizontal or upright position to the other.

It is sufficiently light and is so constructed that it may easily be managed in all its operations by one man, who can load it, move it to a vehicle and fasten it in place there for transportation on the highway, disengage it from the vehicle and move it into position on the job site and tilt it into an upright position for use, and can remove empty cylinders and replace them with fresh ones, all without the assistance of anyone else and without danger of injuring himself or damaging the equipment attached to the cylinders.

It is accordingly the principal object of the invention to provide a carrier and holder for a welding outfit, including the gas cylinders, on which the equipment may be easily loaded and unloaded, which is adapted to transport the welding outfit over the highway pulled by an automobile or other vehicle, which when detached from such vehicle may easily be moved manually, which when placed in an upright position will hold such outfit firmly against falling over, which may be loaded and unloaded and operated and controlled in all its uses by one operator acting alone, and which is strong and simple in operation and relatively inexpensive to manufacture.

Other objects and advantages will be apparent from the following description, the accompanying drawings and the appended claims.

In the drawings:

Fig. 1 is a perspective view of the carrier, shown fastened to attaching means behind an automobile;

Fig. 2 is a side elevational view of the carrier with the near rear wheel and near fender removed, in position for being moved by its handle, with cylinders in place indicated in dotted lines;

Fig. 3 is a rear elevational view of the carrier with the tool box removed;

Fig. 4 is a detailed view on an enlarged scale of the rear section of the cylinder holder in the same arrangement as in Fig. 3, shown in fragmentary form;

Fig. 5 is a side elevational view showing the carrier in an upright operative position in full lines, in a horizontal position for transport in dotted lines, and also in an intermediate position;

Fig. 6 is a top plan view of the carrier with the cylinders and the top portion of the cylinder holder removed, partly broken away to show details of construction;

Fig. 7 is a fragmentary detailed view in section taken substantially on the line 7—7 of Fig. 6, on an enlarged scale; and Fig. 8 is a fragmentary top plan view of a part of the forward end of the carrier, showing the hitch and handle assembly, on an enlarged scale.

Referring to the drawings, which disclose a preferred embodiment of the invention, Fig. 1 shows such a carrier 10 attached to an automobile 11 by attaching means 12 fixed on the rear bumper of the automobile and a shock-absorbing hitch indicated generally at 13, with an oxygen cylinder 15 and an acetylene cylinder 16 in position, in position to be transported over the highway. Carrier 10 is comprised of a frame 17 having parallel side members (Fig. 6) 18 and 19 and parallel connecting front and rear end members 20 and 21. Frame 17 may be made of any standard metal shape such as steel angle iron or steel bars, an economical, light, strong material being standard seamless steel tubing or steel pipe. The tubing or pipe is bent in any well known way to form rounded corners, and the free ends are welded or otherwise joined together to form a single flat, strong, one-piece unit.

Frame 17 is supported at its rear end by a pair of highway vehicle wheels 22 and 23 (Fig. 3) fastened somewhat to the rear of the center of the frame. In order to insure good riding qualities when the outfit is being transported and to reduce shocks and jars to the outfit, these wheels should have pneumatic tires. Any standard vehicle wheel assembly of appropriate size may be used. Those shown in the drawing have stub shafts 25 and 26 attached, and for added strength an axle may be completed by welding a member 27, between the inner opposing ends of said stub shafts. As will be noted from the drawings, it is advisible to fasten such axle on the upper side of the frame in order to reduce the center of gravity and improve the riding qualities of the carrier on the highway.

Frame 17 is supported at its forward end by forward wheel 30 mounted in a yoke 31 fastened to the under side of a plate 32 by means of a swivel connection 33. Plate 32 is welded at the center of front end member 20, and forward wheel 30 is shown as turning freely in all directions to facilitate moving the carrier on its three wheels. The size of wheel 30 and length of the arms of yoke 31 will depend on the diameter of vehicle wheels 22 and 23, the respective positions of the front wheel and the rear wheels being so coordinated that the frame of the carrier is supported substantially parallel to the ground when in such position.

A transverse member 35 (Fig. 6) fixed between side members 18 and 19 forward of axle 27, strengthens the frame and forms a base for forward supports 36 and 37 which are welded on the upper side of transverse member 35, substantially perpendicular to the plane of frame 17. Corresponding rear supports 38 and 39 (Fig. 3) are fastened to rear end member 21. In order to reduce jars and shocks to the cylinders and their attachments when they are being transported, and to improve the riding characteristics of the carrier when being pulled on a highway at the relatively fast modern traveling speeds, forward supports 36 and 37 and rear supports 38 and 39 should be so placed with respect to each other that when the cylinders are in place on the carrier an appreciable portion of their weight, although less than half, is carried forward of the forward supports.

In addition, further cushioning action for the welding outfit is given by the rear supports 38 and 39, which are so constructed as to be springy and resilient in action. Such supports may be made of flat steel bars approximately 1½ inches wide and ¼ inch thick, bent at 41 (Fig. 1) to form two portions substantially at right angles to each other, one end being welded to rear end member 21 and extending rearwardly in substantially the plane of frame 17, and the other portion extending upwardly to form, respectively, the rear supports 38 and 39.

A cylinder holder indicated generally at 40 (Figs. 2 and 3) is fixed to the outer ends of forward supports 36 and 37, and rear supports 38 and 39. Gas cylinders suitable for use in welding are of standard sizes, those for acetylene measuring approximately 9 inches in diameter for the medium size and 13 inches in diameter for the larger size, and for oxygen approximately 7 inches in diameter for the medium size and 9 inches for the larger size. It is customary to use together either the medium size or the larger size cylinders. A simple and inexpensive holder may be formed from standard seamless steel tubing of appropriate diameter cut into desired short lengths by sawing, oxyacetylene cutting or other well known means to form comparatively narrow flat steel hoops, which are assembled into forward section 45 and rear section 46 of the holder, rear section 46 being shown as somewhat wider than forward section 45 for added strength.

Rear section 46 (Figs. 3 and 4), may be made economically and conveniently by cutting two of the hoops previously formed approximately in half into semicircles 52 and 53 and 54 and 55, respectively. Short pieces of flat stock of the same width are welded to the ends of semicircle 52 to form ear 56 and connecting member 57. One end of semicircle 54 is welded to the free end of the connecting member and another short piece of flat stock is welded to the free end of such semicircle 54 to form ear 58, the whole forming a double yoke-shaped holder section indicated by the reference number 59. Holder section 59 is attached to rear supports 38 and 39 by welding the outer part of the circumference of its two semicircles at the outer end of such supports to form the fixed portion 59 of the rear section of the holder.

The movable portion of the rear section of the holder is similarly constructed from the remaining semicircles 53 and 55, which are fitted and joined with ears 60 and 61 and connecting piece 62 to form a movable double yoke-shaped holder member 63 corresponding in shape to fixed member 59. The appropriate end of movable portion 63 then is fastened to fixed portion 59 by hinge 65, the hinge being so placed that a short lip 66 on movable portion 63 extends beyond the closed edge of the hinge such distance that it will not impede the opening of movable portion 63 to a position approximately perpendicular to ear 56, but that when it reaches such position its outer end will come into contact with ear 56 and act as a stop or detent to prevent the movable portion from passing the perpendicular and thus placing an undue strain on hinge 65.

Means for holding the cylinder holder closed are provided for the rear section at 67, and may conveniently consist of a threaded bolt 68 having its head welded to ear 58, and with its threaded end extending upwardly and passing through a slit or hole in ear 61 and fitted with wing nut 69.

Forward section 45 of the cylinder holder is substantially the same in structure as rear section 46 and is fixed in substantially the same manner to the tops of forward connecting members 36 and 37. In order to hold the forward and rear sections of the holder in proper spaced relation and to strengthen the structure, lower longitudinal spacing members 75 and 76 are fixed between the fixed portion of the front and rear sections at their lowest point, where they join the respective connecting members 36, 37, 38 and 39, and upper longitudinal spacing members 77 and 78 are fixed between the movable portion of the front and rear sections at their highest point. These spacing members may conveniently be made from standard flat stock, and welded into place.

Short retaining strips 80 and 81, which may also be made from standard flat stock, are welded across the rear edge of the fixed portion of the cylinder holder to hold the cylinders against rearward movement when they are being transported in a horizontal position, or in the slightly oblique position shown in Fig. 1 in which they are transported on the highway.

It will be seen that the welding outfit may easily be loaded on the carrier and fastened there by a single operator in a simple operation. The cylinders are placed side by side in an upright position on any suitable flat surface, and the carrier is wheeled into an appropriate position adjacent to them. The carrier is then tilted around bend 41 in the rear support members 38 and 39 as a pivot, into an upright position in which it rests on the base formed by the outer faces of the rear support members and of the cylinder holder, with its wheels off the ground. The two sections 45 and 46 of the cylinder holder are opened, and each cylinder is successively tipped slightly so that its weight rests on the perimeter of its base. In this position the greater portion of the weight of the cylinder rests on the edge of the base, rather than on the operator and the cylinder thus may easily be rolled into its appropriate place in the holder by one man alone. The cylinder holder is then closed and fastened, and the valves, gauges and hoses attached, the hoses being wrapped conveniently around the cylinders and fastened, ready to be transported. The carrier with the assembled welding outfit in place may be lowered by the operator by pivoting around bend 41 so that it rests in a substantially horizontal position on its three wheels, ready to be moved. When it is desired to replace one or both of the cylinders, this operation is reversed, and the cylinders removed and replaced with others.

Fenders 85 and 86 may be provided in order to improve the appearance and to prevent splashing of water and dirt when the carrier is being transported on the highway. These may be formed into conventional shape from sheet steel. The forward end of left fender 85 is fastened to frame 17 by brace 87, which is formed from bar stock with its top end bent outwardly and at an appropriate angle and joined to the fender at 88, the bottom end being bent inwardly and fastened to left side member 18 at 89. The highest point of the fender is fastened to the under side of ear 56 by bolts 90. Its rear edge 95, which terminates somewhat forward of the rear end of the carrier in order that it will not touch the ground when the carrier is in upright position (Fig. 6) is flared to approximately the horizontal, and is fastened by bolts 96 to the outer end of brace 97. This brace is formed of bar stock twisted at 98 so that its two end portions are at right angles to each other as clearly appears from Fig. 3, the brace being bent slightly forward to bring its rear edge flush with the rear edge of the fender. The inner end of brace 97 is fastened to rear support 38 by bolt 99.

Right fender 86 is formed and attached to frame 17 in a corresponding manner.

In order conveniently to control the carrier when it is being moved by hand, a handle 100 (Fig. 6) is fastened to the forward end of the carrier. This may be formed from a single length of ⅜ inch round bar stock, bent to form a grip portion 101, a shaft 102, and spring portion 104, the ends of which are inwardly turned to form attaching pins 105. These ends may, if desired, be welded together as shown at 106 (Fig. 8) for added strength. Ears 107 and 108 are welded to the top of plate 32, with holes in their upper ends receiving pins 105. It will be seen that handle 100 may be pivoted on said pins 105 in a forward direction for pulling the carriage (Fig. 2), and in a backward direction along the center line of the carriage to fit between the cylinders (Figs. 1 and 5), where it is conveniently out of the way when the carrier is being pulled behind a vehicle or is at rest in either a horizontal or upright position.

Between the ears 107 and 108 is fastened a simple but strong and efficient shock-absorbing hitch indicated generally by reference numeral 13 and shown in detail in Fig. 7 for fastening the carrier to a vehicle for transportation on the highway. This hitch comprises a cylinder 111 welded to the top of plate 32 and held in position at its front end by ears 107 and 108 and at its rear by plates 112 welded to its sides and to plate 32. Cylinder 111 is fitted at its forward end with a suitable cap 113 welded thereon, and with a sliding disk 114 fitted snugly but slidingly inside it. Between cap 113 and disk 114 is coil spring 115. Bolt 120 is fitted through apertures at the center of cap 113 and disk 114, passing through the center of the coil of spring 115 and being held in place against disk 114 by nut 121, nut 121 being itself secured by cotter pin 122. The head of bolt 120 is formed to cooperate with means fastened to the vehicle for attaching the carrier thereto, being shown in the drawing as having a ring-shaped head 124 to receive a pin, but a standard ball and socket connection or any other well known attaching device may be used.

The carrier may easily be fastened to a vehicle by lifting its forward end until it is inclined toward a horizontal position and forward wheel 30 is maintained out of contact with the ground, and fastening the head of bolt 120 to cooperating attaching means 12. The shocks and jerks between the carrier and the vehicle pulling it, both in starting and stopping and in traveling on the road, will be absorbed and reduced by the flexing action of spring 115 pressing between cap 113 and plate 114. Spring 115 should be sufficiently heavy to absorb and control the strains which are placed on it, and a proper degree of tension may easily be placed on it by adjusting nut 121.

Transverse braces 130 and 131 (Fig. 6), which may conveniently be formed from angle iron, are welded between side members 18 and 19, serving both to strengthen the frame and to support toolbox 132 for carrying welding materials, wrenches and similar material for use with the outfit.

It will thus be seen that the invention furnishes an efficient, light, strong device for transporting a welding outfit, which has many advantages. It may be used in place of an automobile truck, effecting a large saving in investment, and may be managed in all its operations by a single operator, saving a great deal in time and wages. It is adaptable as a vehicle trailer, as a hand-pulled carrier, and as a stabilizer for the outfit when in an upright position, and it is at the same time relatively simple and inexpensive to manufacture.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A carrier for transporting a welding outfit on the highway and for supporting it in an upright position in use, comprising a frame, a pair of vehicle wheels at either side of said frame, a holder on said frame for removably receiving a plurality of cylinders containing gas for welding, resilient means on said frame extending rearwardly thereof forming a support for said cylinders during highway transportation, said resilient means including a spring portion substantially in the plane of said frame and a portion substantially at right angles to said spring portion constituting a base for holding said cylinders in substantially upright operative position on a supporting surface when said frame is tilted to said upright position for use of said outfit, and means at the forward end of said frame for connecting said carrier to an automotive vehicle for said highway transportation with said frame and said cylinders inclined toward a horizontal position.

2. A carrier for transporting a welding outfit on the highway and for supporting it in an upright position in use, comprising a frame, a pair of vehicle wheels at either side of said frame, a smaller wheel at the forward end of said frame for supporting said carrier in substantially horizontal position for manual movement from place to place, a holder on said frame for removably receiving a plurality of cylinders containing gas for welding, resilient means on said frame extending rearwardly thereof forming a support for the rear of said cylinder holder, said resilient means including spring portions substantially in the plane of said frame, and support portions substantially at right angles to said spring portions, said support portions and the rear of said holder providing a base for supporting said cylinders in substantially upright operative position on a supporting surface when said frame is tilted to an upright position for use of said outfit, and means at the forward end of said frame for connecting said carrier to an automotive vehicle for said highway transport thereof with the forward end of said frame inclined above said horizontal position and with said smaller wheel maintained out of contact with said supporting surface.

3. A carrier for transporting a welding outfit as a highway vehicle and by manual operation comprising a frame, a pair of vehicle wheels at either side of said frame, a swivel wheel at the forward end of said frame adapted to support said frame in substantially horizontal position for manual movement from place to place, a holder on said frame for removably receiving a plurality of cylinders containing gas for welding, said holder including a forward portion positioned above said frame when in horizontal position, a rearward portion separate from said forward portion positioned above said frame when in horizontal position and spaced rearwardly of the rear of said frame, and resilient means connecting said rearward portion with said frame, part of said resilient means being substantially at right angles to said frame and said resilient means providing a pivot for rocking said frame to an upright operative position and a base for supporting said frame in said upright operative position, and connecting means at the forward end of the frame for connecting said carrier to an automotive highway vehicle for transport thereby on the highway with said swivel wheel maintained out of contact with the ground.

4. In a carrier adapted for transporting a welding outfit as a highway vehicle and by manual operation and for supporting it in upright position during operation, the combination of a frame, a pair of vehicle wheels at either side of said frame, a wheel at the forward end of said frame adapted to support said frame in substantially horizontal position for manual movement from place to place, a holder on said frame for removably receiving a plurality of cylinders containing gas for welding, resilient means at the rear of said frame forming rear supports for said holder, said resilient means including portions which are substantially horizontal and other portions which are substantially upright when said frame is in horizontal position, said upright portions constituting a base for maintaining said welding outfit in an upright operative position with all of said wheels off the ground when said carrier is tilted to said upright position, the portion of said resilient means between the horizontal and upright portions thereof constituting a pivot for rocking said frame from one position to the other, and connecting means at the forward end of the frame for connecting said carrier to an automotive vehicle for transport thereby with said forward wheel maintained out of contact with the ground.

5. A carrier for transporting a welding outfit as a highway vehicle and by manual operation comprising a frame, a pair of vehicle wheels at either side of said frame, a swivel wheel at the forward end of said frame adapted to support said frame in substantially horizontal position for manual movement from place to place, a holder on said frame for removably receiving a plurality of cylinders containing gas for welding, clamp means for securely retaining said cylinders in said holder during use and providing for ready removal and replacement thereof, rearwardly extending resilient means on said frame, said means including a substantially horizontal portion constituting a spring for said holder when said cylinders therein are in horizontal position and a substantially upright portion providing a support for said holder when said cylinders are in horizontal position and a base for said holder when said cylinders are in upright operative position, and a central portion providing a pivot for rocking said carrier and welding outfit from one position to the other, and connecting means at the forward end of the frame for connecting said carrier to an automotive vehicle for highway transport thereby with said swivel wheel maintained out of contact with the ground.

6. A retaining unit for a welding outfit adapted for holding said oufit in position during operation and for transporting it as a highway vehicle, comprising a frame, a holder for removably receiving a plurality of cylinders containing gas for welding spaced above said frame, said holder including a forward cylinder-receiving section and a rearward cylinder-receiving section spaced from said forward section, means for attaching said front section to said frame, means for attaching said rear section to said frame, said latter means including resilient portions substantially in the plane of said frame and flat portions substantially at right angles to said first portions cooperating with said rear section of said holder to provide a relatively thin flat base lying flat on a supporting surface for releasably receiving the bottom end of said cylinders when said bottom end is in contact with said surface during loading and unloading of said cylinders into said unit, said base supporting said unit on said surface in upright operative position for a welding operation, a pair of vehicle wheels at either side of said frame and a single wheel at the forward end of said frame for maintaining said retaining unit in substantially horizontal position when said unit has been rocked to such position for manual movement from place to place, and connecting means at the forward end of the frame for connecting said retaining unit to an automotive vehicle for transport as a highway vehicle with the forward end of said frame above the horizontal and said forward wheel maintained out of contact with the ground.

EDWARD E. KETZEL.

REFERENCES CITED

The following references are of record in the file of this patent:

UNITED STATES PATENTS

| Number | Name | Date |
|---|---|---|
| 1,197,007 | Bulley | Sept. 5, 1916 |
| 1,203,299 | Atkins | Oct. 31, 1916 |
| 1,587,842 | Knox | June 8, 1926 |
| 1,896,249 | Russell | Feb. 7, 1933 |
| 2,219,585 | Begin | Oct. 29, 1940 |
| 2,392,955 | Stalcup | Jan. 15, 1946 |
| 2,463,967 | Hefelfinger | Mar. 8, 1949 |
| 2,513,604 | Vandermark | July 4, 1950 |
| 2,513,932 | Grube | July 4, 1950 |

FOREIGN PATENTS

| Number | Country | Date |
|---|---|---|
| 217,372 | Switzerland | Oct. 15, 1941 |